Dec. 21, 1937.  A. BOUWERS  2,102,883
DEVICE FOR CHARGING CONDENSERS
Filed Nov. 22, 1935
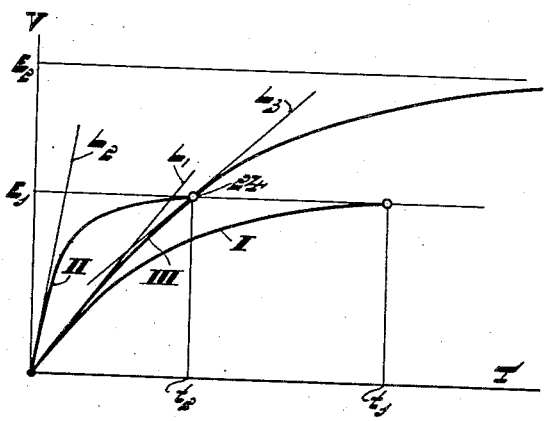
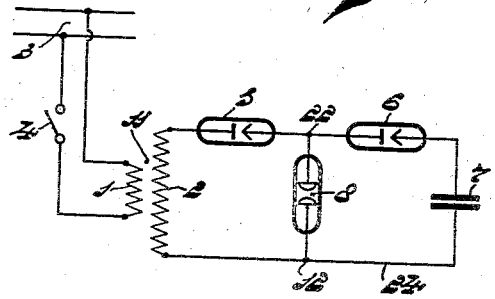
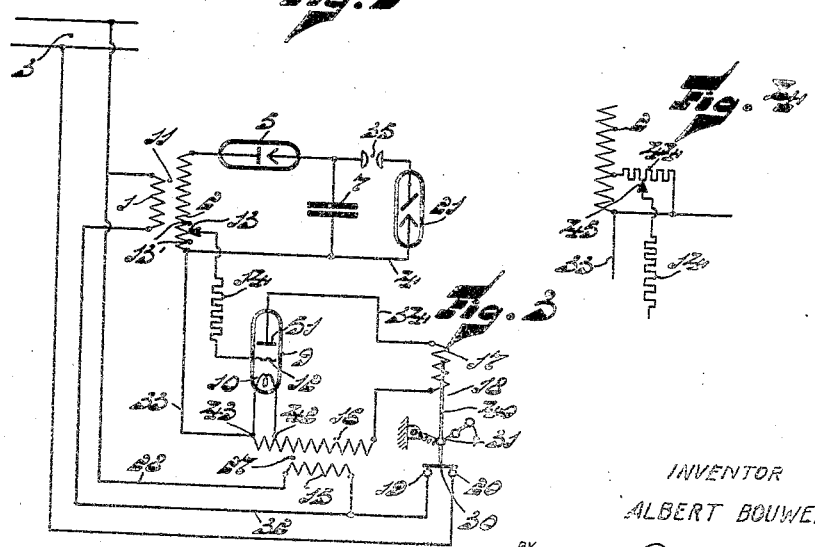
INVENTOR
ALBERT BOUWERS
BY
ATTORNEY Patented Dec. 21, 1937

2,102,883

UNITED STATES PATENT OFFICE 2,102,883

DEVICE FOR CHARGING CONDENSERS

Albert Bouwers, Eindhoven, Netherlands, assignor to N. V. Philips' Gloeilampenfabrieken, Eindhoven, Netherlands Application November 22, 1935, Serial No. 51,166
In Germany December 6, 1934

11 Claims. (Cl. 175—363)

The present invention relates to devices for charging condensers.

My invention is particularly adapted for use with X-ray installations and will be described in this connection. However, its use is not limited thereto, but is of advantage in other cases in which it is desirable to charge a condenser in a short period of time.

In cases where it is desired to use a high-intensity current for a short period of time, it is known to use as a source of energy a condenser which is previously charged at a comparatively small current intensity and over a relatively long period of time, the condenser then being discharged at a high current intensity over a short period of time. For example in X-ray installations, the condenser is charged through a rectifying device from a high-voltage transformer connected to the usual alternating current mains.

As the time during which the condenser is being charged greatly exceeds the discharge period, for instance is more than one hundred times the discharging time, the alternating current mains are only slightly loaded during the charging, although a large amount of energy is taken therefrom during the charging period.

In such systems—assuming the charging circuit has a constant impedance—the intensity of the charging current gradually decreases during the charging of the condenser as the voltage across the condenser increases. Thus the time required to charge the condenser depends upon the highest initial current intensity which can be utilized, the latter in turn depending upon the power capacity of the current supply source. The only way the charging time of such systems could be reduced was by providing a more powerful electric installation.

Such a long charging time is very disadvantageous, especially in X-ray installations for making instantaneous radiographs in which it is desirable to keep the time between the switching-on of the charging current and of the discharge current as small as possible. For example, in making cinematographic and other series exposures with the aid of a plurality of condensers, such a long charging time is disadvantageous as it makes the use of a large number of condensers necessary, or reduces the number of pictures which can be taken per second.

According to my invention the time required to charge a condenser from supply mains of a given power is substantially reduced by charging the condenser from a current source whose no-load voltage substantially exceeds the voltage to which the condenser is to be charged, and by providing means whereby the charging is discontinued when the condenser voltage has reached this desired value, i. e., the operating voltage.

As a current source a transformer whose no-load voltage is at least 30% greater than the operating voltage may be used.

To discontinue the charging when the voltage of the condenser reaches the operating value, the terminal voltage of the current source may be controlled by providing a discharge path, for instance a spark gap or a gas-filled discharge tube, which is made conductive when the voltage of the condenser reaches the operating value. Due to the resulting current flow through such a discharge path, the terminal voltage of the current source is maintained at the operating voltage or is reduced below such a value. With the use of rectified alternating current for the charging of the condenser, the discharge path may be connected in front of or behind the rectifier; however it is preferable to provide two rectifiers, one between the discharge path and the alternating current source, and the other between the discharge path and the condenser. The former rectifier serves to prevent the discharge path from absorbing energy during the nonoperative half-waves of the alternating current, whereas the latter rectifier serves to prevent the condenser from discharging back through the discharge path.

In another embodiment the charging of the condenser is discontinued by providing means to interrupt the primary circuit of an alternating current source which charges the condenser through a rectifier. For instance a voltage relay may be actuated by the secondary voltage of a transformer supplying the charging current, which relay interrupts the primary circuit of the transformer when the voltage across the condenser reaches the operating value.

Such a relay may be connected to the secondary winding of the transformer; however in the case of high voltages it is preferable to connect it across a portion of the secondary winding. If a special impedance is used for taking up the potential difference between the source of alternating current and the condenser, the relay may be connected across this impedance so as to switch off the charging current when the voltage across the impedance drops below a predetermined value.

To prevent the relay from being actuated by the reversely-directed half-waves occurring in the nonoperative half-cycles, a discharge tube having a control electrode, for instance a grid-controlled gas-filled discharge tube, may be used. In such case the voltage used for the control is connected between the control electrode and the cathode of the tube so as to be in phase with an alternating voltage applied between the anode and the cathode of the tube. If such a discharge tube is connected to the transformer winding, it must be ignited when the condenser voltage has attained its operating value, whereas the anode current of the discharge tube should preferably actuate a switch which interrupts, either directly or with the interposition of another relay device, both the primary circuit of the transformer used for charging, and the anode circuit of the discharge tube.

In order that my invention may be clearly understood and readily carried into effect, it will be more fully described with reference to the accompanying drawing, in which:

Figure 1 is a diagram for use in explaining the invention;

Figure 2 is a schematic wiring diagram of a device according to the invention;

Fig. 3 is a schematic wiring diagram showing another embodiment of a device according to the invention.

Fig. 4 is a modification of the wiring diagram shown in Figure 3.

Referring to the diagram shown in Figure 1, in which the ordinates represent voltages and the abscissae represent time, the exponential curve I indicates the variation in voltage occurring across a condenser while the condenser is being charged from a source of voltage having a value $E_1$. For simplicity the voltages are assumed as being continuous unidirectional.

The intensity of the charging current, which at any time during the charging corresponds to the slope of the tangent to the curve at the point corresponding to the time, is a maximum at the beginning of the charging—as indicated by tangent $L_1$—and decreases, until at the point corresponding to time $t_1$, is substantially zero. Thus, it is seen that the charging of the condenser up to a voltage $E_1$ requires the time indicated by the point $t_1$, which time is relatively long, and in any case is considerably longer than the time which would be required if the condenser were charged at a constant current intensity.

Although the time required to charge the condenser to the voltage $E_1$ may be reduced, for example to a time $t_2$ by charging in accordance with the exponential curve II, in this case the initial, maximum current intensity indicated by tangent $L_2$ is considerably greater than the maximum current intensity indicated by tangent $L_1$ for the curve I. Such an increase in the initial current intensity is a serious drawback as the highest current intensity which can be employed for the charging is usually limited by the power capacity of the supply mains. Thus, it is seen that—provided the initial current intensity cannot be increased above the value represented by the tangent $L_1$—it is impossible to reduce the charging time of the condenser below the value $t_1$ unless the impedance of the charging circuit is decreased during the charging period.

In accordance with the present invention, instead of using a current supply source having a voltage $E_1$, a current supply source having a no-load voltage appreciably higher than the voltage to which the condenser is to be charged is used.

As indicated in Fig. 1, $E_2$ represents the no-load voltage of a current supply source which is to be used for charging a condenser to a voltage $E_1$, which charging takes place in accordance with the time-voltage curve III. At the beginning of the charging period the initial and maximum current intensity has a value corresponding to the slope of the tangent $L_1$; thus the same as for curve I. During the charging of the condenser the output voltage of the current supply source gradually rises towards its no-load value $E_2$ and the condenser is charged in accordance with the curve III. It will be noted that the curve III does not approach the line $E_1$ asymptotically, but intersects it at a point 24, at which point the slope of the tangent $L_3$ does not greatly differ from the slope of tangent $L_1$. Thus it is seen that during the time the condenser is being charged up to a voltage $E_1$ the current intensity of the charging current is substantially constant and that the condenser is charged to a voltage $E_1$ in a time $t_2$, which is considerably shorter than the time $t_1$. In accordance with the present invention the charging of the condenser is discontinued when the voltage of the current source reaches the value $E_1$ i. e., the operating voltage of the condenser.

To obtain a substantial reduction in the time of the charging period, it is necessary that the no-load voltage of the current source be considerably greater than the voltage to which the condenser is to be charged, for instance at least 30% greater. For example if the no-load voltage of the source is 70% greater than the operating voltage of the transformer, the time necessary for charging the condenser may be reduced to less than 50% of the time necessary when the voltage available does not substantially exceed the operating voltage.

The invention is particularly important in those cases in which, as a current supply source, a small transformer having a sufficient impedance to absorb the difference between the no-load voltage and the voltage occurring at the condenser is used. In such cases it is necessary that the transformer have a much higher secondary voltage and a larger voltage drop (leakage) than transformers previously used for this purpose. However, the initial power taken from the mains will remain the same in either case.

Referring to Fig. 2, a transformer 11 has a primary winding 1 and a secondary winding 2; the primary winding 1 being connected with one end to one side of a suitable alternating current supply line 3 and with its other end through a switch 4 to the other side of the supply line 3. One end of the secondary winding 2 is connected through a conductor 24 to one electrode of a condenser 7 whose other electrode is connected through two series-connected rectifiers 5 and 6 to the other end of the secondary winding 2.

Connected between a point 22 between the rectifiers 5 and 6 and a point 12 of a conductor 24 is a discharge path 8 having a breakdown voltage equal to the operating voltage of the condenser 7, i. e., the voltage to which the condenser is to be charged. The discharge path may be a gas-filled discharge tube, or in the case of a high-voltage installation such as an X-ray device, may be a spark gap.

Upon closure of the switch 4 transformer 11 is energized from the mains 3 and a rectified current flows from secondary winding 2 through rectifying tubes 5 and 6, whereby charging of condenser 7 takes place in accordance with curve III of Fig. 1. During the charging of the condenser, the voltage across same—as well as the voltage between points 22 and 12—increases whereby the voltage between the points 12 and 22 is slightly higher than the voltage at the condenser and slightly lower than the terminal voltage of the transformer 11, in accordance with the voltage drop in the rectifiers 5 and 6. Upon the voltage between points 12 and 22 reaching a value slightly higher than the operating voltage ($E_1$ of Fig. 1), the discharge path 8 becomes conductive and allows the passage of sufficient current to prevent the terminal voltage of secondary winding 2 from increasing above the corresponding value, although the no-load voltage is much higher. Due to the flow of current through the discharge path 8, the voltage of the secondary winding 2 may drop below the operating voltage of the condenser; however the rectifier 6 prevents the condenser 7 from discharging back through the discharge path 8. On the other hand, the rectifier 5 prevents the discharge path 8 from being ignited during the charging by the full no-load voltage occurring in the nonoperative half-waves.

The charge produced in condenser 7 may be used for various purposes for which a high-intensity current is desired for a short time, and for simplicity the discharge circuit has been omitted.

In the device illustrated in Fig. 3 the charging is discontinued when the condenser voltage reaches its operating value by deenergizing the current source. As shown therein, the secondary winding 2 of transformer 11 has one end connected through conductor 41 to one electrode of the condenser 7, whose other electrode is connected through a rectifier 5 to the other end of the winding 2. Connected across the electrodes of condenser 7 is a discharge circuit including a high tension switch 35 (shown as a discharge gap) and an X-ray tube 21. Other means than a high tension switch may be used for switching on the discharge current through the X-ray tube 21. This may be effected in known manner, for instance by heating the incandescible cathode of the X-ray tube.

Thus the charging of condenser 7 takes place through the circuit including rectifier tube 5, secondary winding 2, and condenser 7, whereas the condenser is discharged through circuit including the discharge gap 35 and X-ray tube 21.

To prevent the condensers from being charged to a voltage higher than the operating voltage, means are provided to deenergize the transformer 11 when the voltage across the condenser reaches the operating value, which means comprise a relay 18, transformer 27, and a discharge tube 9. The relay 18 has an actuating coil 17 and a plunger rod 40 provided on the lower end with a contact bar 30, which in its lower position connects two contacts 19 and 20. Connected to the plunger rod 40 is a toggle device 31, which in known manner serves to retain the plunger bar 40 in either its upper or lower position.

Transformer 27 has a primary winding 15 and a secondary winding 16, one end of the primary winding being connected through conductor 28 to one end of primary winding 1, and also to one side of the supply line 3, whereas the other end is connected through conductor 32 to the other end of the primary winding 1 and to contact 19. Thus the primary windings 1 and 15 are connected in parallel, whereby the energization of transformers 11 and 27 from the alternating current mains 3 is controlled by the contact bar 30.

The discharge tube 9 has an anode 51, a control electrode 12, and an incandescible cathode 10, one end of the cathode being connected at 43 to secondary winding 16 and through conductor 33 to one end of the secondary winding 2, whereas its other end is connected to a point 42 on secondary winding 16. Thus the cathode is supplied with heating current from portion 43—42 of winding 16. The anode 51 is connected through conductor 34 to one end of coil 17, whose other end is connected through secondary winding 16 to complete the anode circuit of the tube.

The control electrode 12 is connected through a protective resistance 14 to a tap 13 on secondary winding 2; the tap 13 being so located on the winding 2 that at the moment at which the voltage across the condenser reaches the operating value, the potential applied to the control grid 12 is sufficient to ignite the tube and permit the flow of current in the anode circuit. In order to slightly vary the potential on the control electrode 12, and thus the point at which ignition of the tube takes place, it is preferable to provide a plurality of taps 13' in the vicinity of tap 13, or to connect a potentiometer 44 over a portion of winding 2 and to lead the connection from control 12 through resistance 14 to a variable contact 45 on said potentiometer as shown in Fig. 4.

Thus when the voltage across condenser 7 reaches the operating value and the tube 9 is ignited, current flows in the anode circuit of tube 9, coil 17 is energized, and plunger rod 40 is raised into its upper position, whereby contacts 19 and 20 are discontinued and transformers 11 and 27 deenergized. The charging of the condenser ceases and the energy so stored therein can then be discharged through the X-ray tube 21. Due to the use of the tube 9, the relay 18 will be actuated only by the voltage occurring in the operative half-waves and not by the voltages of the reversely directed half-waves.

The deenergization of transformer 27 results in the deenergization of coil 17; however plunger rod 40, due to the toggle device 31, is held in its upper position and contacts 19 and 20 remain disconnected. The charging of the condenser can again be initiated by manually moving the contact bar into its lower position.

It is of course possible to use various other types of relay arrangements instead of the relay 18, for instance for switching on the charging current a separate switch interlocked mechanically and/or electrically with relay 18 may be used, or the relay 18 may be returned to its lower position by remote control.

While I have described my invention in connection with specific examples and applications, I do not wish to be limited thereto but desire the appended claims to be construed as broadly as permissible in view of the prior art.

What I claim is:—

1. A device for charging a condenser comprising, a current source having a no-load voltage substantially greater than the operating voltage of the condenser, and means connected with the charging circuit of the condenser and independent of the discharge circuit of the condenser to prevent charging of the condenser above its operating voltage without causing the discharge of the condenser.

2. A device for charging a condenser comprising, a current source having a no-load voltage at least 30% greater than the operating voltage of the condenser, and means connected with the charging circuit of the condenser and independent of the discharge circuit of the condenser to prevent charging of the condenser above its operating voltage without causing the discharge of the condenser.

3. A device for charging a condenser comprising, a current source having a no-load voltage substantially greater than the operating voltage of the condenser, and means to decrease the terminal voltage of the current source when the voltage of the condenser reaches the operating value.

4. A device for charging a condenser comprising, an alternating current source having a primary circuit and a no-load voltage substantially greater than the operating voltage of the condenser, a rectifier to supply unidirectional charging current to the condenser, and means to interrupt the primary circuit of said current source when the voltage of the condenser reaches its operating value.

5. A device for charging a condenser comprising, a current source having a no-load voltage substantially greater than the operating voltage of the condenser, a discharge path connected across said source and having an ignition voltage equal to the operating voltage of the condenser, said discharge path upon ignition allowing the passage of sufficient current to maintain the terminal voltage of said source at a value equal to the operating voltage, and means to prevent discharge of the condenser through said discharge path.

6. A device for charging a condenser comprising, a current source having a no-load voltage substantially greater than the operating voltage of the condenser, a discharge path connected across said source and having an ignition voltage equal to the operating voltage of the condenser, said discharge path upon ignition allowing the passage therethrough of sufficient current to reduce the terminal voltage of said source below the operating voltage of said condenser, and means to prevent discharge of the condenser through said discharge path.

7. A device for charging a condenser comprising, an alternating current source having a no-load voltage substantially greater than the operating voltage of the condenser, a discharge path connected across said source and having an ignition voltage equal to the operating voltage of said condenser, said discharge path upon ignition allowing the passage therethrough of sufficient current to maintain the terminal voltage of said source at a value equal to the operating voltage, and means for rectifying the current supplied by said source, said means comprising a rectifier between said condenser and said discharge path and a second rectifier between said current source and said discharge path, said first rectifier preventing the back discharge of said condenser through said discharge path and said second rectifier preventing the ignition of said discharge path by the nonoperative half-waves of the alternating current.

8. A device for charging a condenser comprising, a transformer having a primary winding and a secondary winding, the no-load voltage of said transformer being substantially greater than the operating voltage of said condenser, a rectifier to rectify the alternating current into a unidirectional charging current for said condenser, and a voltage relay connected to said secondary winding and controlling the current in said primary winding, said relay deenergizing said primary winding when the condenser becomes charged to its operating voltage.

9. A device for charging a condenser comprising, a transformer having a primary winding and a secondary winding, the no-load voltage of said transformer being substantially greater than the operating voltage of said condenser, a rectifier to change the alternating current supplied by said transformer into a unidirectional charging current for said condenser, a relay having a coil and controlling the flow of current in said primary winding, a gas-filled discharge tube having a cathode, an anode and a control electrode, said cathode and control electrode being connected to points on said secondary winding, and an anode circuit for said discharge tube and including the coil of said relay, said relay interrupting the current flow in said primary winding when the condenser voltage reaches the operating value.

10. A device for charging a condenser comprising, a transformer having a primary winding and a secondary winding, the no-load voltage of said transformer being substantially greater than the operating voltage of said condenser, a rectifier to change the alternating current supplied by said transformer into a unidirectional charging current for said condenser, a gas-filled discharge tube having a cathode, an anode and a control electrode, said cathode and control electrode being connected to points on said secondary winding, an anode circuit for said discharge tube including a current source, and a relay having a coil in said anode circuit, said relay interrupting the current flow in said primary winding and anode circuit when the condenser voltage reaches the operating value.

11. A method of charging a condenser comprising the steps, charging the condenser from a current source having a no-load voltage substantially greater than the operating voltage of the condenser, and terminating the charging when the condenser voltage reaches the operating value while maintaining the condenser in its charged condition.

ALBERT BOUWERS.